United States Patent [19]

Soos

[11] 4,039,216

[45] Aug. 2, 1977

[54] MANUAL GRASPING DEVICE

[76] Inventor: Imre Soos, 12124 Cedar Ave., Hawthorne, Calif. 90250

[21] Appl. No.: 666,139

[22] Filed: Mar. 11, 1976

Related U.S. Application Data

[63] Continuation-in-part of Ser. No. 530,931, Dec. 9, 1974, abandoned.

[51] Int. Cl.² ............................. A47F 13/06; B25J 1/00
[52] U.S. Cl. .................................... 294/19 R; 294/100
[58] Field of Search ................... 294/11, 20, 22, 19 R, 294/50.5, 50.6, 50.8, 50.9, 100, 104, 106, 110 A, 115

[56] References Cited

U.S. PATENT DOCUMENTS

| 233,672 | 10/1880 | Haley | 294/19 R X |
|---|---|---|---|
| 944,214 | 12/1909 | Rydquist | 294/22 |
| 1,187,316 | 6/1916 | Higby | 294/50.8 |
| 1,591,354 | 7/1926 | Baillie | 294/11 |
| 1,941,064 | 12/1933 | Wendt | 294/115 X |
| 2,869,914 | 1/1959 | Yoakley | 294/22 |
| 3,219,376 | 11/1965 | Peters | 294/19 R X |
| 3,527,492 | 9/1970 | Hollis | 294/19 R |

*Primary Examiner*—Johnny D. Cherry
*Attorney, Agent, or Firm*—Herzig & Walsh Incorporated

[57] ABSTRACT

A grasping device having an elongated stem with manual operating means at one end. At the opposite end are a pair of jaws actuatable by a rod telescoped within the elongated stem. The manual operating means includes a lever that is manually grasped to be pulled towards a fixed handle, the operating lever having connections to a line which has engagement with the actuating rod for moving it to actuate the jaws for grasping.

2 Claims, 4 Drawing Figures

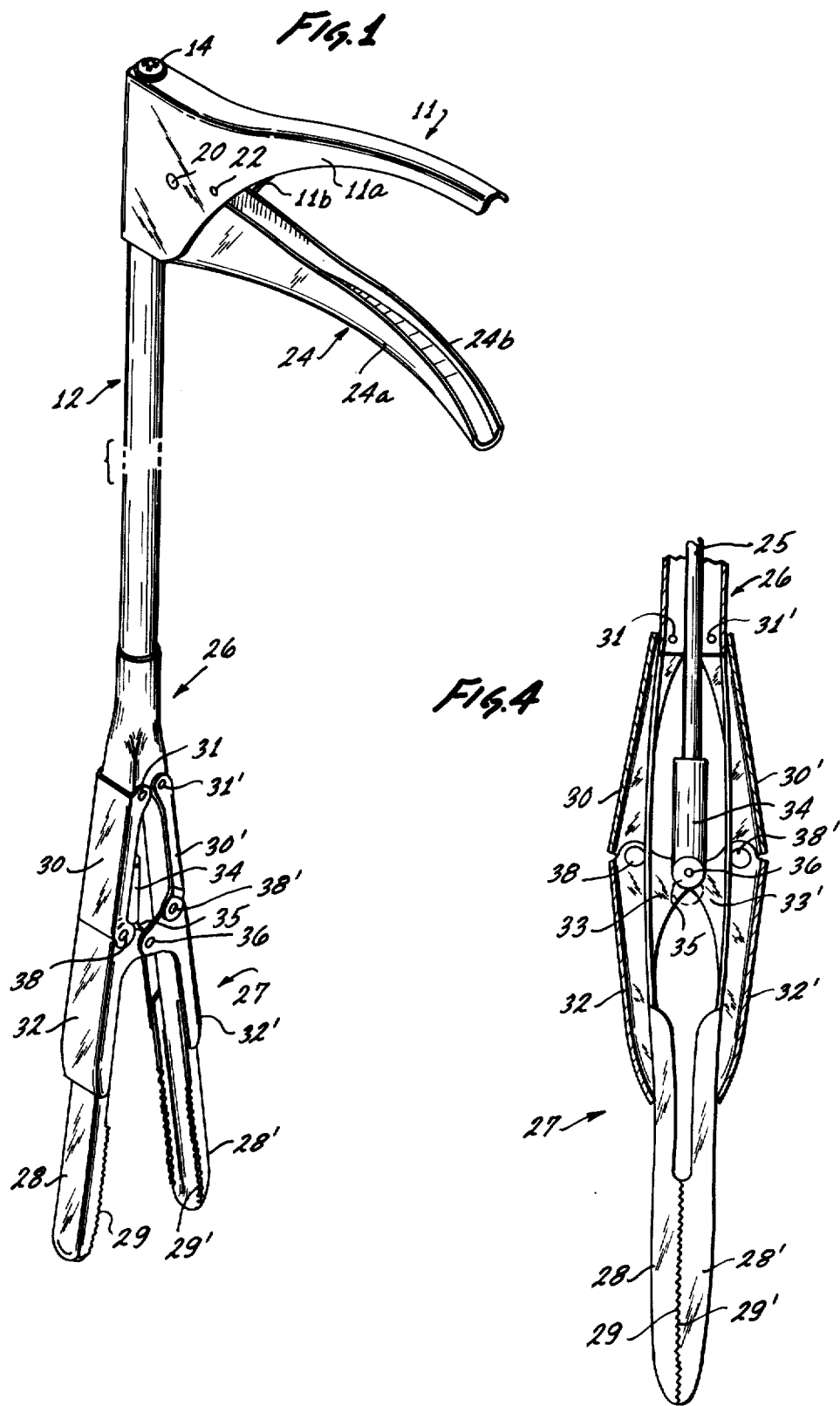

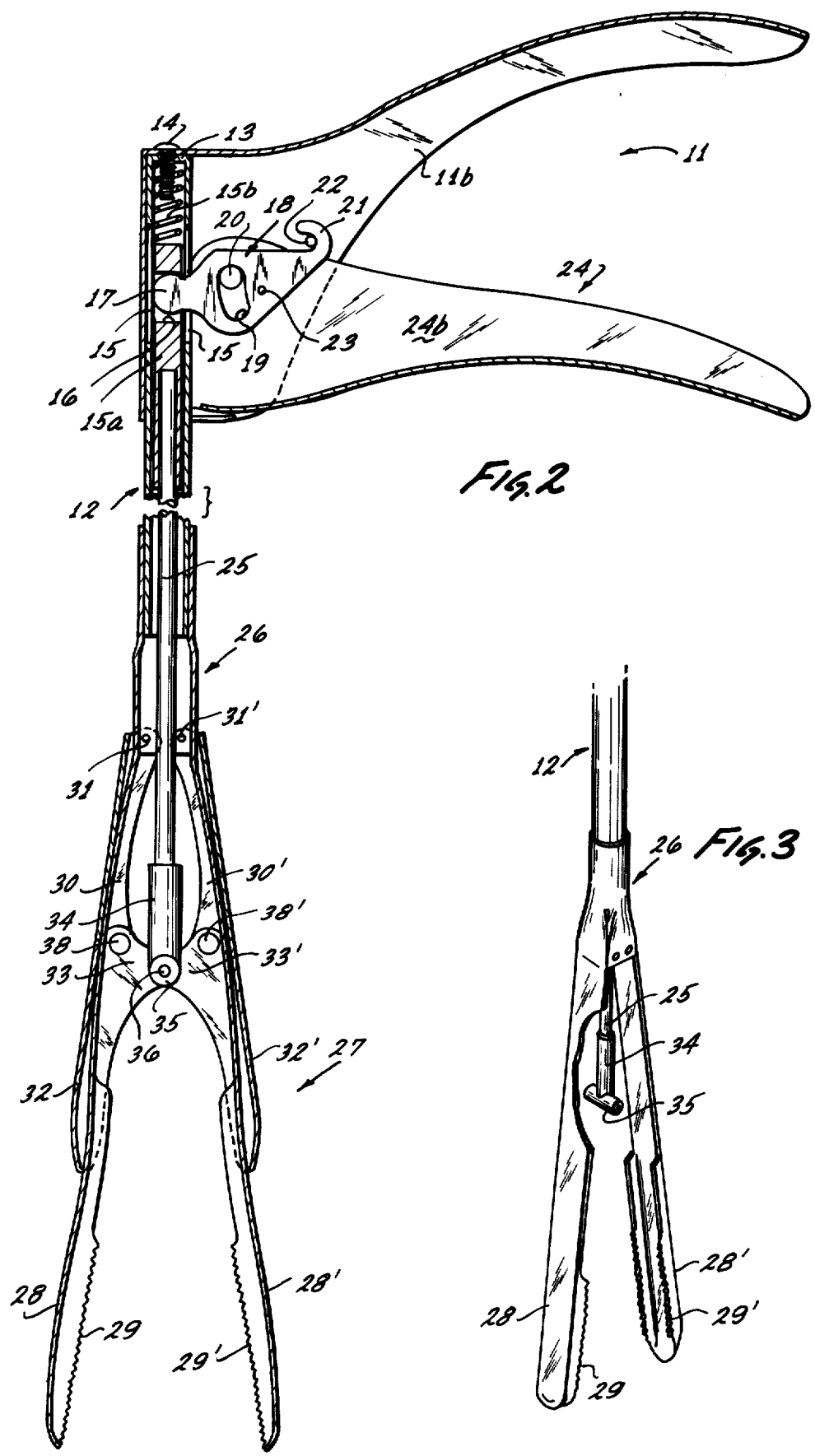

MANUAL GRASPING DEVICE

This application is a continuation-in-part of Ser. No. 530,931 filed Dec. 9, 1974 now abandoned.

BACKGROUND OF THE INVENTION

1. Field of the Invention

The field of the invention is that of manual devices embodying grasping jaws whereby an implement or tool is provided for purposes of grasping objects or things in relatively inaccessible places that cannot otherwise be readily reached.

2. Description of the Prior Art

The presently known prior art is exemplified in U.S. Pat. Nos. 919,731; 1,187,316; 2,819,110; 3,219,376; 3,208,786; and 388,776. The prior art patents show devices capable of grasping articles having a relatively long handle or long stem, and manual actuating means for the grasping mechanism. However, none of these known prior art devices are relevant to the particular unique mechanism of the invention is identified more particularly hereinafter.

SUMMARY OF THE INVENTION

The invention embodies an elongated tubular stem having a handle and manual operating means at one end and the grasping jaws at the opposite end. The jaws are operated by an operating rod telescoped within the elongated stem. The jaws are connected to links which are hinged to the stem and which are operable to be pulled together by means of a pull on the operating rod. The operating handle is fixed to the stem and associated with it is a pivoted lever for actuating the operating rod. Connected between the said lever and the operating rod is a linkage hinged so that when said lever is pulled upwardly toward the handle the linkage mechanism is actuated so that an upward pull is exerted on the operating rod and it acts on the jaws so as to pull them together for grasping an article.

In the light of the foregoing the primary object of the invention is to provide a manually actuatable remote grasping device wherein grasping jaws are caused to be moved together by way of unique and improved actuating means.

Another object is to provide a grasping device, implement or tool, as in the foregoing having an elongated stem with a handle at one end and with an actuating lever associated with the handle and linkage mechanism connected between the lever and the operating stem for jaws whereby jaws are actuated pulling the lever towards the handle.

Further objects and additional advantages of the invention will become apparent from the following detailed description and annexed drawings.

BRIEF DESCRIPTION OF THE DRAWINGS

FIG. 1 is an isometric view of the invention;

FIG. 2 is a cross-sectional view of FIG. 2.

FIG. 3 is a detail view of the fitting on the end of the operating rod and the jaws;

FIG. 4 is a partial view showing the jaws in closed position.

DESCRIPTION OF THE PREFERRED EMBODIMENT

Referring to the drawings, the device as a whole is shown in FIGS. 1 and 2. The parts of the device as shown may be made of aluminum or other suitable preferably light material. Numeral 11 designates a handle having a configuration as shown in the drawings, having sides or side wings 11a and 11b as shown. Received in the handle in a position as shown between the side wings is the upper end of tube 12. The tube 12 has end wall 13 and handle 11 is secured to this end wall by the screw 14 as shown.

Numeral 15 designates a slot in a side wall tube 12 for purposes of accommodating actuating mechanism as will be described presently.

Numeral 15a designates a rod that is reciprocatable within the tube 12. The rod 15a has formed in it a slot 16 which receives and accommodates an end part 17 of a link member 18, the end part extending through the slot 15 in the tube 12. The link 18 has an arcuate slot 19 in which is received a pin 20 which extends between the sides of handle 11 and on which lever 24 is mounted as will be described. At the end of the link 18 there is a hook 21 that hooks over a pin 22 which extends between the side wings of the handle 11, as may be seen in the figures.

Operating lever 24 has side wings 24a and 24b like the handle 11. Link 18 is positioned between the side wings of the lever 24 and is pivoted to it by way of the pivot pin 23. The pin 20 is carried by the handle 11. The slot 19 allows relative movement between lever 24 and link 18. The end parts of the sides or side wings 24a and 24b straddle tube 12, lever 24 being within or between the side wings of handle 11.

Rod 15a is normally biased in a downward direction by means of a spring 15b. Handle 11, as may be seen, is fixed to the tube 15 whereas the lever 24 is positioned between the side wings of the handle 11.

Numeral 25 designates a rod or stem that is secured to the rod member 15a that is telescoped within the tube 12.

Numeral 26 designates a fitting secured to the lower end of the tube 12. The upper part of the fitting 26 is cylindrical and the end of the tube 12 is telescoped into it and the lower end of the fitting 26 is formed to have a square configuration.

Numeral 27 designates generally the jaw assembly. There are two jaw members 28 and 28' which comprise flexible strips of material that are integral with the fitting 26 and extend therefrom as shown. At the ends of the jaws at the sides thereof there are flanges and adjacent the ends these flanges are serrated to form jaws as designated at 29 and 29'.

Numerals 30 and 30' designate a primary pair of links. These links are channel shaped having side flanges and they are pivotally attached to the square end of the fitting 26 on pivot pins 31 and 31'.

Numerals 32 and 32' designate a secondary pair of links. These links are channel shaped having side flanges which have inwardly extending portions designated at 33 and 33'. At the end of the stem 25 is a fitting as designated at 34 at the end of which is a transverse bushing 35 as may be seen in FIG. 3. The portions 33-33' of the secondary links 32-32' are pivotally mounted to the bushing 35 on a pin 36. The end portions of the links 32-32' are pivotally attached to the ends of links 30 and 30' on pivot pins 38 and 38'. As may be seen the jaw members 28 and 28' normally lie within the channels formed by the insides of the two pairs of links.

As previously described the lever 24 has pivotal attachment to the link 18 by way of the pivot pin 23. The operation of the device or implement will be described hereinafter.

OPERATION

The implement may be held in one hand by grasping the handle 11 with the fingers around the lever 24. Preferably the implement is made of light material such as aluminum as previously described. To grasp any object the lever 24 is pulled upwardly towards the handle 11. The handle 24 rotates in a counterclockwise direction about pin 20 so that the pin 23 is moved in a clockwise direction moving the link 18 in a clockwise direction with respect to the pin 22. Thus, its end 17 moves upwardly moving the rod 15a and stem 25 upwardly. The end fitting 34 is pulled upwardly pulling upwardly on the inner portions 33-33' of the links 32 and 32' so that they pivot or rotate inwardly about their pivot pins 38 and 38' bringing the jaws 28 and 28' towards each other. In this manner the tool or implement can be used to reach into inaccessible places to grasp objects or objects can be grasped on the ground without bending over to pick them up.

The closing action is illustrated in FIG. 4 showing the actuation of the two pairs of links pulling the flexible jaws toward each other.

From the foregoing those skilled in the art will readily understand and appreciate the nature of construction of the implement and its utilization. It can be readily constructed of simple materials and is very light and easy to handle. The grasping function of the jaws is achieved by way of a unique linkage such that merely by an upward pull at the handle end of the implement the grasping action is realized. The two pairs of links facilitate realizing the grasping action with only limited movement of handle 24.

The foregoing disclosure is representative of the preferred form of the invention and is to be interpreted in an illustrative rather that eliminating sense the invention to be afforded to full scope of the claims appended hereto.

What is claimed is:

1. An implement for grasping articles comprising an elongated member, operating handle means at one end of the member, means having grasping jaws at the other end of the member, the operating handle means including a lever and means connecting the lever to the grasping jaw means, said connecting means including a stem whereby reciprocating movement of the stem causes the jaw means to grasp, the grasping jaw means including flexible jaws integral with the member and including link means having pivotal connection to the member, the stem having connection to the link means at a position which is spaced from the connection of the link means to the member whereby reciprocation of the stem actuates the link means to engage the jaws causing the jaw means to grasp.

2. An implement for grasping articles comprising an elongated member, operating handle means at one end of the member, means having grasping jaw means at the other end of the member, the operating handle means including a first lever and a second lever and means connecting the second lever to the grasping jaw means, said connecting means including a stem whereby reciprocating movement of the stem causes the jaw means to grasp, said second lever being connected to the first lever and being pivoted in a position whereby angular movement of the first lever in one direction moves the second lever in the opposite direction, said jaw means including jaws integral with the end part of the member and having flexibility whereby they can be forced together, link members having pivotal attachment to the elongated member and positioned for engaging the jaws to draw them together, the stem having connection to the link members for actuating them.

* * * * *